3,255,157
FLUOROAZIRINE POLYMERS AND SELECTED FLUOROAZIRINE MONOMERS
Charles S. Cleaver, Wilmington, Del., assignor to E. I. du Pont de Nemours and Company, Wilmington, Del., a corporation of Delaware
No Drawing. Filed Jan. 24, 1963, Ser. No. 253,761
14 Claims. (Cl. 260—79)

This invention relates to, and has as its principal objects provision of, a new class of fluorine-containing polymers, their preparation, and monomeric precursors thereof.

The production of fluorine-containing polymers is steadily increasing because the generally high quality of such polymers is well recognized and improvements in the synthesis of the corresponding monomers are constantly being developed. The fluorine-containing polymers that have achieved commercial status are, for the most part, fluoro-hydrocarbon polymers.

A radically new and unusual type of fluorine-containing polymers has been prepared through the use of fluoro-substituted azirines. More specifically, there are now provided:

A. Polymers containing the recurrent fluoro-substituted aziridine units (I)

or the recurrent fluoro-substituted ethylidenimine units (II)

wherein $R_1$ is fluorine or perfluoroalkyl; $R_2$ is fluorine, perfluoroalkyl, alkoxycarbonyl, cyano or, when both $R_1$ and $R_3$ are fluorine, pentafluorosulfur; $R_3$ is (1) fluorine or perfluoroalkyl, (2) when $R_2$ is fluorine, alkoxycarbonyl or cyano, or (3) when both $R_1$ and $R_2$ are fluorine, pentafluorosulfur; and no more than two of $R_1$, $R_2$ and $R_3$ are simultaneously fluorine; and B. Fluoro-substituted azirines, other than 2,3-difluoro-2-trifluoromethylazirine, having the formula (III)

wherein $R_1$, $R_2$ and $R_3$ are as previously defined and no more than two of $R_1$, $R_2$ and $R_3$ are simultaneously fluorine.

Preferred products of this invention are those in which perfluoroalkyl $R_1$, $R_2$ and $R_3$ contain from 1 to 12 carbons each, and especially preferred are those products in which perfluoroalkyl $R_1$, $R_2$ and $R_3$ are perfluoro-lower alkyl, i.e., groups containing from 1 to about 8 carbon atoms. Likewise, when $R_2$ or $R_3$ is alkoxycarbonyl, i.e., the substituent

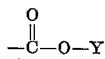

where Y is alkyl, preferred products are those in which Y contains from 1 to 18 carbon atoms and especially preferred are those in which Y is lower alkyl.

The fluoroazirines of Formula III are the monomers from which polymers having the recurring units I and II are derived. The transformation of the monomers to the corresponding polymers is illustrated in the following schematic reaction sequence:

(a)

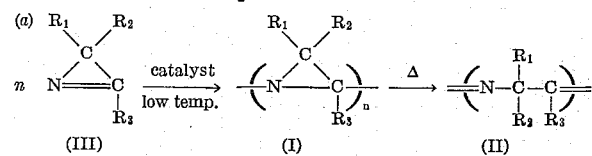

The fluoroazirine monomers are obtained from fluoroolefinic compounds and ionic azides, as illustrated in the following schematic reactions, wherein the groups $R_1$, $R_2$ and $R_3$ are as previously defined, and $ZN_3$ represents ionic azide in which Z is cationic and $N_3$ is the azide anion.

(b)

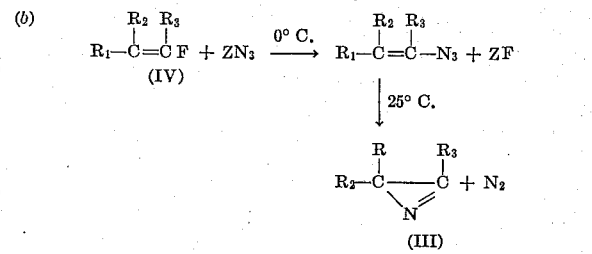

When $R_2$ is fluorine, i.e., when the fluoroolefinic precursor (Formula IV) has a fluorine attached to each of the two carbons carrying the double bond, the fluoroazirine monomer obtained as portrayed in reaction sequence (b) can be represented generally by the following restricted version of formula III,

Fluoroazirines of Formula V undergo isomerization when warmed in the presence of a small amount of hydrogen fluoride, as follows:

(c)

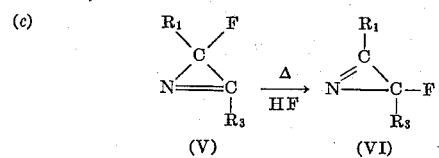

The isomers of Formula VI are included within the scope of Formula III. In the instance where $R_1$ and $R_3$ in Formula V are the same, e.g., the fluoroazirine monomer derived from perfluoro-2-butene, there is on actual isomerization, since Formulas V and VI are then identical.

Polymerization of the fluoro-substituted azirines of Formula III to form polymers having the recurring fluoroaziridine unit I, as shown in the schematic reaction (a) is effected by means of ionic catalysts or high voltage electrons. With an ionic catalyst, which can be used either in the presence or absence of inert diluents, e.g., in an inert solvent, polymerization proceeds readily at low temperatures, i.e., temperatures of about —100° C. to —25° C. Under an electron beam polymerization occurs rapidly at temperatures as low as —200° C. Ionic catalysts that initiate polymerization are preferably soluble in the monomer or in a solvent in which the monomer is soluble to the extent of at least about one percent, and include tertiary amines, N,N-dialkylcarboxamides, quaternary ammonium salts, aliphatic ethers, aliphatic sulfides and alkali metal fluorides. Although the amount of the ionic catalyst employed is not critical it is ordinarily used in small proportions for practical reasons, e.g., a proportion in the range of about 0.01 to 10 percent by weight or volume of the monomer, and preferably a proportion in the range of about 0.1 to 5 percent.

The recurring fluoroaziridine structural units of Formula I, which are the functional portions of the polymers obtained by polymerization of the fluoroazirine monomers of Formula III, are thermally unstable. The cyclic fluoroaziridine units rearranged on heating to form acyclic fluoroethylidenimine units that are resistant to further thermally-induced change. Accordingly as depicted in the schematic reactions (a), polymers having the recurring structural units of Formula II are the ultimate thermally-stable products. Rearrangement of the fluoroaziridine polymers occurs at moderate temperatures in the range of about 0 to 200° C. The temperature within this range at which a specific fluoroaziridine polymer is converted to the corresponding fluoroethylidenimine polymer is somewhat dependent upon the specific $R_1$, $R_2$ and $R_3$ substituents and their placement. Thus, polymers of Formula I in which both $R_1$ and $R_2$ are fluorine, i.e., polymers having 2,2-difluoroaziridine units, undergo rearrangement in the range of about 25–75° C.; and polymers of Formula I in which $R_1$ or $R_2$, together with $R_3$, are fluorine, i.e., polymers having 2,3-difluoroaziridine units, require somewhat higher rearrangement temperatures in the range of about 100–200° C.

The fluoroaziridine-derived polymers include homopolymers, copolymers from two or more fluoroazirine monomers, and copolymers from one or more fluoroazirine monomers with one or more other monomers which are polymerizable by means of ionic catalysts or electron irradiation, i.e., monomers which normally form homopolymers and copolymers at temperatures below about 0° C. in the presence of an ionic catalyst or under the beam of a high voltage electron generator.

The invention is further illustrated in the following examples in which parts are by weight, volumes are equivalent to the volume of one part of water, and pressures are expressed in mm. of mercury.

EXAMPLE I

*Trifluoromethyldifluoroazirines*

A solution of hexafluoro-1-propenyl azide in 400 volumes of s-tetrachloroethane is prepared by the method of Knunyants and Bykhovskaya [Academy of Sciences (USSR) Proceedings, Chemistry Section, English translation, vol. 131, 411 (1960)], from 75 parts of hexafluoropropylene and triethylammonium azide derived from 60 parts of triethylamine. The solution is held at 0° C. under reduced pressure (5–20 mm.) for 2 hours, and the volatile materials which evolve are collected in a trap cooled in liquid nitrogen. The condensed volatiles are allowed to warm to 25° C., and at this temperature there is a slow evolution of nitrogen the volume of which is measured after it has passed through a water-cooled condenser and a trap cooled to −78° C. The volume of nitrogen corresponds to 35–42% of the theoretical amount, calculated on the basis of one mole of nitrogen per mole of hexaflouro-1-propenyl azide and assuming complete conversion of hexafluoropropylene to the azide, i.e., $C_3F_5N_3 \rightarrow C_3F_5N + N_2$. Condensed liquid product that is cooled in the trap at −78° C. is fractionated in a low temperature still, and the following fractions are separated:

| Fraction | Volume | B.P. (° C.) |
|---|---|---|
| 1 | 3.75 | −20 to −17 |
| 2 | 3.75 | −17 |
| 3 | 3.75 | −17 |
| 4 | 3.75 | −17 |
| 5 | 2.5 | −17 |

The product of B.P. −17° C. is analyzed.

Analysis for $C_3F_5N$:            F.
Calc'd _____ 65.5
Found _____ 65.7

Infrared analysis of the fractions shows the presence of three principal products which are designated compounds A, B and C, respectively. Compound A is the predominant product, the proportion of compound B decreasing from about 50% in fraction 1 to about 2% in fraction 5 and the proportion of C remaining at about 1–2% in all fractions.

Mixtures of compounds A, B and C, such as in the above-described fractions 1 to 5, are separated by gas chromatography. Samples of 0.5 to 0.75 volume are introduced into a gas chromatographic column (2 inch diameter x 6 feet long) packed with 60–80 mesh firebrick containing 20% by weight of methyl 2,4,6,7-tetrachloroperfluorooctanoate. The column is maintained at 0° C., and the sample is eluted by helium flowing at the rate of 300 volumes per minute. Eluted fractions are collected in traps cooled in liquid nitrogen (−196° C.). Two principal fractions are obtained: the first being a mixture of compounds B and C, and the second being pure compound A. From a total of 6.5 volumes (10 to 12 chromatographed samples) is obtained about 3 volumes of each principal fraction, which are further analyzed by infrared and n-m-r spectroscopy. Compound A is identified as 2,3-difluoro-2-trifluoromethylazirine

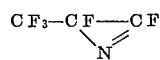

compound B is identified as hexafluoropropylene; and compound C is identified as 2,2-difluoro-3-trifluoromethylazirine

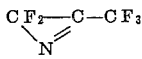

The characteristic properties of compounds A and C are tabulated as follows:

| Formula | A<br>CF₃—CF—CF<br>\N⁄ | C<br>CF₂—C—CF₃<br>\N⁄ |
|---|---|---|
| Boiling Point | −17° C | −17° C. |
| Melting Point | Below −78° C | Below −78° C. |
| Infrared Absorption | 5.45μ (CF=N)<br>6.8μ (azirine ring)<br>7.5μ<br>8.2μ (C—F)<br>8.9μ<br>9.9μ | 5.85μ (C=N).<br>6.95μ (azirine ring).<br>7.85μ<br>8.2μ (C—F).<br>9.6μ |
| n-m-r Spectrum (fluorine resonance vs. CF₂ClCF₂Cl reference at 56.4 megacycles). | Three different peaks in 3:1:1 size ratio, at—<br>+695–700 c.p.s. (doublet).<br>+1,730–1,780 c.p.s. (doublet).<br>+4,658–4,710 c.p.s. (doublet). | Two different peaks in 3:2 size ratio, at—<br>+245 c.p.s. (singlet).<br>+2,255 c.p.s. (singlet). |

EXAMPLE II

*Preparation of 2,2-difluoro-3-trifluoromethylazirine*

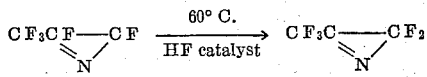

Three volumes of gas chromatographically purified liquid 2,3-difluoro-2-trifluoromethylazirine is distilled into a vessel constructed of a 6″ length of ⅜″ diameter platinum tubing. Fifty volumes of gaseous hydrogen fluoride is added and the vessel is sealed. The sealed tube is placed in a pressure vessel and is heated for 4 hours at 60° C. under 500 lb./sq. in. of nitrogen. The resultant reaction mixture is composed of 1.6 volumes of product that is volatile at 25° C. and 2 mm. pressure, and 1.5 volumes of non-volatile liquid residue. The volatile fraction is found by infrared analysis to be a mixture of 2,3-difluoro-2-trifluoromethylazirine and 2,2-difluoro-3-trifluoromethylazirine containing about 75% of the latter. The mixture is separated by gas chromatography and the identity of the pure 2,2-difluoro-3-trifluoromethylazirine fraction is confirmed by infrared and nuclear magnetic resonance (n–m–r) analysis.

Similar treatment with hydrogen fluoride of pure 2,2-difluoro-3-trifluoromethylazirine does not produce any detectable amount of the 2,3-difluoro isomer, and it is therefore concluded that the isomerization is not reversible under the conditions shown above.

EXAMPLE III

*Polymerization of difluoro(trifluoromethyl)azirines*

A. 2,3-DIFLUORO-2-TRIFLUOROMETHYLAZIRINE

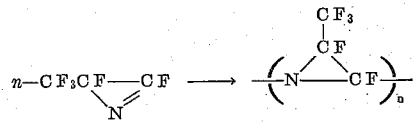

To a 1-volume sample of pure liquid, 2,3-difluoro-2-trifluoromethylazirine cooled to −78° C. in a glass container is added about 0.02 volume of pyridine, and the mixture is briefly stirred. The liquid mixture immediately increases in viscosity and in about 10 minutes is transformed into a colorless transparent solid. The mixture is held at −78° C. for 2 hours, is warmed and held for 30 minutes at −30° C., and is then allowed to warm to 25° C. After 15 minutes at 25° C., the polymeric product is placed under vacuum and found to contain negligible amounts of volatiles. The elastomeric polymer is soluble in 1,1,2-trichloro-1,2,2-trifluoroethane, swollen in chloroform, plasticized by a-dichlorotetrafluoroacetone, insoluble in acetone, unreactive with concentrated nitric acid, colored deep red by triethylamine, and reactive with concentrated ammonium hydroxide. A film of the polymer cast from 1,1,2-trichloro-1,2,2-trifluoroethane and examined in the infrared shows weak absorption at 5.7µ (CF=N), very strong absorption at 6.95µ (azirdine ring) and broad strong absorption at 7.6–10µ (C—F bonds). A solution of the polymer in 1,1,2-trichloro-1,2,2-trifluoroethane shows a fluorine n–m–r spectrum containing three broad peaks in the size ratio 3:1:1, respectively, at +515, +3460, and +6055 c.p.s. relative to the fluorine peak of s-tetrachlorodifluoroethane as a standard, at 56.4 megacycles.

2,3-difluoro-2-trifluoromethylazirine is polymerized readily in the foregoing manner using cesium fluoride as catalyst in place of pyridine, and the resultant polymer is essentially identical to that described above. The monomer is also polymerized in a sealed glass tube at −196° C. (i.e., cooled in liquid nitrogen) on exposure for 1–3 seconds to the beam of an electron accelerator (2 mev., 250 microamps), a high molecular weight elastomeric polymer which is partly soluble in 1,1,2-trichloro-1,2,2-trifluoroethane being formed in about 50% conversion. This polymer has infrared absorption at 6.9µ characteristic of the azirdine ring.

B. 2,2-DIFLUORO-3-TRIFLUOROMETHYLAZIRINE

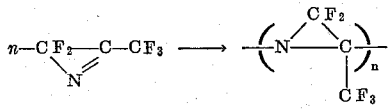

About 0.02 volume of pyridine is added to approximately 0.5 volume of pure liquid 2,2-difluoro-3-trifluoromethylazirine cooled to −78° C. in a glass vessel. The monomer is immediately polymerized to a white opaque solid polymer which is insoluble in 1,1,2-trichloro-1,2,2-trifluoroethane, chloroform or carbon tetrachloride. A mineral oil ("Nujol") mull of the polymer examined in the infrared shows strong broad absorption at 7.7 to 8.8µ and 9.1 to 9.7µ (C—F) but is indeterminate at 6.9µ (izirdine ring) because of interference by the absorption of the mineral oil. A mull in 1,1,2-trichloro-1,2,2-trifluoroethane, however, shows strong absorption at 6.9µ without interference by the substrate.

An opaque, stiff solid polymer such as that described above is obtained by use of tetraethylammonium cyanide in place of pyridine in the foregoing procedure. Likewise, the same type of polymer is obtained in about 10% conversion on exposure of the monomer at −196° C. to the beam of an electron accelerator for about one second.

EXAMPLE IV

*Rearrangement of difluoro(trifluoromethyl)aziridine polymers*

A. POLYMER FROM 2,3-DIFLUORO-2-TRIFLUOROMETHYLAZIRINE

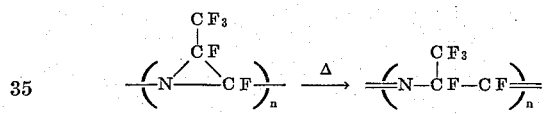

A sample of solid elastomeric polymer prepared according to the procedures of Example III–A is heated at 140–160° C. for a few minutes. A vigorous action occurs and the solid polymer is changed to a colorless viscous grease which remains unchanged by further heating or cooling. A film cast from a solution of the viscous polymer in 1,1,2-trichloro-1,2,2-trifluoroethane shows strong infrared absorption at 5.65µ (CF=N) and 7.6 to 9.3µ (C—F), and weak absorption at 6.9µ (aziridine ring), the weakness of the latter indicating substantial reduction in the number of aziridine rings. The fluorine n–m–r spectrum (56.4 megacycles, with s-dichlorotetrafluoroethane as the reference) of the 1,1,2-trichloro-1,2,2-trifluoroethane solution contains three broad peaks attributable to the polymer, at −2547, +811 and +4307 c.p.s. in size ratios of 1:3:1, respectively.

B. POLYMER FROM 2,2-DIFLUORO-3-TRIFLUOROMETHYLAZIRINE

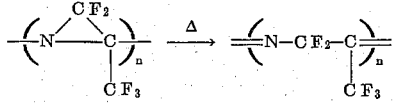

A sample of the opaque stiff solid polymer prepared according to any of the procedures of Example III–B is heated at 40° C. and is rapidly converted to a thick grease. The grease is soluble in 1,1,2-trichloro-1,2,2-trifluoroethane, and a film cast from a solution in this solvent shows strong infrared absorption at 5.7 to 5.9µ (C=N) and 7.7 to 9.9µ (C—F) but no absorption at 6.9µ (aziridine ring), absence of which indicates essentially complete loss of aziridine linkages in the thermolyzed polymer.

EXAMPLE V

*Copolymers of difluoro(trifluoromethyl)azirines*

A. COPOLYMER FROM 2,3-DIFLUORO-2-TRIFLUOROMETHYLAZIRINE AND THIOCARBONYL FLUORIDE

A solution of two volumes of 2,3-difluoro-2-trifluoromethylazirine and 10 volumes (13.3 parts) of thiocarbonyl fluoride in 50 volumes of dry ether, contained in a glass vessel, is stirred and cooled to −78° C. Four drops of dimethylformamide is added from a syringe through a number 22 hypodermic needle. A polymer is formed gradually, and after 4 hours at −78° C. the mixture is allowed to warm to room temperature. The precipitated ether-swollen polymer is placed in boiling water to drive off the ether and any other volatiles, and the product is finally air-dried. The dry product (9 parts) is a light yellow, tough polymer which is insoluble but is highly swollen in chloroform or 1,1,2-trichloro-1,2,2-trifluoroethane. Infrared analysis of the polymer shows the presence of both aziridine ring and —$CF_2S$— units. The polymer contains nitrogen in an amount which conforms approximately to a composition having 2.4 moles of thiocarbonyl fluoride per mole of the azirine.

*Analysis.*—Calculated for 2.4/1 $CSF_2/C_3F_5N$: N, 4.1. Found: N, 3.9, 4.2.

When heated at 175° C. for 5 minutes the copolymer becomes soluble in 1,1,2,-trichloro-1,2,2,-trifluoroethane, and infrared analysis now shows the presence of >C=N— units together with fewer aziridine units than in the unheated copolymer.

B. COPOLYMER FROM 2,3-DIFLUORO-2-TRIFLUOROMETHYLAZIRINE AND TETRAFLUOROETHYLENE OXIDE

A mixture of 0.437 part of tetrafluoroethylene oxide and 0.013 part of 2,3-difluoro-2-trifluoromethylazirine is cooled to −196° C. in a liquid nitrogen bath and irradiated for 1–3 seconds under the beam of a 2 mev. Van de Graaff electron accelerator operating at 250 microamps. Approximately 50 percent of the mixture is converted to an elastomeric product, and the recovered unpolymerized volatiles contain none of the azirine. Infrared analysis of the polymeric product shows the presence of both aziridine and —$CF_2CF_2O$— units, and after the elastomer is heated for a few minutes at ca. 150° C. the spectrum shows >C=N— linkages that were not present before.

The 2,2-difluoro-3-trifluoromethyl- and 2,3-difluoro-2-trifluoromethylazirines prepared in Example I, in which substitutent $R_1$ is trifluoromethyl, are gaseous low-boiling compounds which do not freeze at −78° C. Other fluoroazirines may have similar physical properties or they may be liquids or solids depending upon the specific nature of the substituent groups $R_1$, $R_2$ and $R_3$. Although very much alike physically, there is a significant chemical difference between 2-fluoro- and 3-fluoroazirine isomers, this difference residing in the presence or absence of fluorine at position 3 of the 2H-azirine ring. For example, the fluorine at position 3 in 2,3-difluoro-2-trifluoromethylazirine is relatively labile as evidenced by its hydrolysis in aqueous alkali, whereas both of the ring fluorines in 2,2-difluoro-3-trifluoromethylazirine are resistant to hydrolysis and are not classified as labile.

The fluoroaziridine polymers derived from the fluoroazirine monomers are solid products ranging from soluble to insoluble in solvents such as acetone, chloroform or 1,1,2-trichloro-1,2,2-trifluoroethane. The soluble polymers can be cast into self-supporting transparent films which are tough, flexible and usually elastomeric; and the insoluble polymers are opaque, hard and brittle. As demonstrated in Example IV, these polymers are structurally rearranged on heating to form fluoroethylidenimine polymers which have quite different properties from the parent fluoroaziridine polymers. The thermally derived fluoroethylidenimine polymers are heat-stable, generally soluble, and tractable; and they range in physical appearance from semisolid grease-like materials to solid, flexible, plastic products.

A variety of fluoroaziridine and fluoroethylidenimine polymers and the fluoroazirine monomers from which they are derived can be obtained by methods illustrated in the foregoing examples. Variations in the substituents $R_1$, $R_2$ and $R_3$, defined in the previous discussions of the structural Formulas I, II, and III, are obtained by starting with fluoroolefinic precursors

(Formula IV) having corresponding variations in the groups $R_1$, $R_2$ and $R_3$. Specific examples of such variations are presented in the following table:

TABLE

| Fluoroolefinic Precursor | $R_1$ | $R_2$ | $R_3$ |
|---|---|---|---|
| $C_2F_5CF=CF_2$ | $C_2F_5$ | F | F |
| n-$C_5F_{11}CF=CF_2$ | n-$C_5F_{11}$ | F | F |
| n-$C_{10}F_{21}CF=CF_2$ | n-$C_{10}F_{21}$ | F | F |
| $(CF_3)_2C=CF_2$ | $CF_3$ | $CF_3$ | F |
| n-$C_3F_7\overset{CF_3}{\underset{\|}{C}}=CF_2$ | n-$C_3F_7$ | $CF_3$ | F |
| $CF_3CF=CFCF_3$ | $CF_3$ | F | $CF_3$ |
| $C_2F_5CF=CFC_2F_5$ | $C_2F_5$ | F | $C_2F_5$ |
| $CH_3O\overset{O}{\underset{\|}{C}}CF=CF_2$ | $CH_3O\overset{O}{\underset{\|}{C}}-$ | F | F |
| $C_6H_{13}O\overset{OCF_3}{\underset{\|}{\overset{\|}{C}}}=CF_2$ | $C_6H_{13}O\overset{O}{\underset{\|}{C}}-$ | $CF_3$ | F |
| $C_{18}H_{37}O\overset{O}{\underset{\|}{C}}CF=CF_2$ | $C_{18}H_{37}O\overset{O}{\underset{\|}{C}}-$ | F | F |
| $CF_2=CFCN$ | F | F | NC |
| $CF_3\overset{CN}{\underset{\|}{C}}=CF_2$ | $CF_3$ | NC | F |
| $F_5SCF=CF_2$ | $F_5S-$ | F | F |

Methods for preparing fluoroolefins, fluoroolefinic esters and fluoroolefinic nitriles listed in the above table are reported by Lovelace, Rausch and Postelnek ("Aliphatic Fluorine Compounds," chapters III, IX and X, Reinhold Publishing Corp., New York, 1958), and in U.S. 2,795,601. Trifluorovinylsulfur pentafluoride, $F_5SCF=CF_2$, is reported by Case, Ray and Roberts, J. Chem. Soc., 1961, 2070.

Copolymers can be formed by copolymerization of two or more fluoroazirines with each other or with one or more different ionic catalyst- or electron beam-polymerizable monomers. Examples of different monomers that copolymerize with the fluoroazirines are ethylene oxide, tetrafluoroethylene oxide, thiocarbonyl fluoride, perfluoroalkanethioyl fluorides or chlorides (e.g., trifluorothioacetyl fluoride or perfluorobutanethioyl chloride) and perfluoroalkyl thioketones (e.g., perfluorothioacetone). In these copolymers the fluoroaziridine structural units derived from the fluoroazirine monomers are thermally unstable and undergo rearrangement to thermally stable fluoroethylidenimine structural units on heating.

Polymerization and copolymerization of the fluoroazirines is brought about by organic soluble ionic catalysts or by high voltage electrons. Examples of ionic catalysts that are especially preferred are tertiary amines (e.g., triethylamine, quinoline, dimethylaniline or N-methylmorpholine), N,N-dialkylcarboxamides (e.g., dimethylformamide, diethylacetamide or diamylbenzamide), quaternary ammonium halides (e.g., tetraethylammonium bromide, laurylpyridinium chloride or benzyltrimethylammonium chloride) and non-oxidizing metal fluorides (e.g., potassium bifluoride, cesium fluoride, aluminum fluoride, or boron trifluoride).

The fluoroaziridine and fluoroethylidenimine polymers are useful in the water-proofing and grease-proofing of fabrics, and the application of the polymers for this purpose can be accomplished in various ways. The soluble fluoroaziridine and fluoroethylidenimine polymers can be deposited on the fabric from solution, and the insoluble fluoroaziridine polymers can be applied as dispersed powders or pastes. Subsequent ironing with a warm iron will set them on the fabric. The following example illustrates the water-proofing of fabrics with polymers of this invention.

EXAMPLE A

One part of an aziridine polymer derived from 2,3-difluoro-2-trifluoromethylazirine (Example III–A) is dissolved in 100 volumes of 1,1,2-trichloro-1,2,2-trifluoroethane. Swatches of cotton, wool and nylon fabrics are dipped in the solution and air-dried. The fabrics are then ironed with a thermostat-controlled electric hand iron (rayon temperature setting), laundered and dried. The treated and laundered fabrics exhibit good repellancy toward water and fairly good repellancy toward a white mineral oil. Similar treatment of cotton and wool fabrics with an ethylidenimine polymer derived from 2,3-difluoro-2-trifluoromethylazirine (Example IV–A) also confer water and oil repellancy to the fabrics.

The difluoroazirines are useful as gaseous water-proofing impregnants for textile fibers and fabrics, e.g., cotton, wool or nylon. The following example illustrates this use.

EXAMPLE B

Samples of cotton and wool fabrics and fibers are placed in a vessel, the vessel is closed and evacuated, and gaseous, 2,3-difluoro-2-trifluoromethyl-azirine is introduced to a pressure of one atmosphere. The vessel is then heated for 10 minutes at 95–100° C., after which the samples of fabrics and fibers are removed. The treated cotton has good water repellancy, and the treated wool has relatively poor water repellancy. After the treated materials are laundered, however, the wool has good water repellancy and the cotton has retained its water repellancy.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the formula

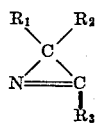

wherein:
 $R_1$ is selected from the group consisting of fluorine and perfluoroalkyl of up to 12 carbons;
 $R_2$ is selected from the group consisting (1) of fluorine, perfluoroalkyl of up to 12 carbons, alkoxycarbonyl of up to 19 carbons and cyano and (2), when both $R_1$ and $R_3$ are fluorine, also of pentafluorosulfur; and
 $R_3$ is selected from the group consisting (1) of fluorine and perfluoroalkyl of up to 12 carbons, (2) when $R_2$ is fluorine, also of alkoxycarbonyl of up to 19 carbons and cyano, and (3), when both $R_1$ and $R_2$ are fluorine, also of pentafluorosulfur;
 with the proviso that no more than two of $R_1$, $R_2$ and $R_3$ are simultaneously fluorine and that when $R_1$ is trifluoromethyl no more than one of $R_2$ and $R_3$ is fluorine.

2. 2,2-difluoro-3-trifluoromethylazirine.

3. A polymer containing recurrent units selected from the group consisting of

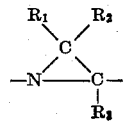

and

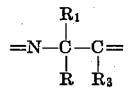

wherein:
 $R_1$ is selected from the group consisting of fluorine and perfluoroalkyl of up to 12 carbons;
 $R_2$ is selected from the group consisting of (1) fluorine, perfluoroalkyl of up to 12 carbons, alkoxycarbonyl of up to 19 carbons and cyano and (2), when $R_1$ and $R_3$ are both fluorine, pentafluorosulfur; and
 $R_3$ is selected from the group consisting of (1) fluorine and perfluoroalkyl of up to 12 carbons, (2) when $R_2$ is fluorine, also of alkoxycarbonyl of up to 19 carbons and cyano, and (3), when both $R_1$ and $R_2$ are fluorine, also of pentafluorosulfur;
 with the proviso that no more than two of $R_1$, $R_2$ and $R_3$ are simultaneously fluorine.

4. A polymer of 2,3-difluoro-2-trifluoromethylazirine.

5. A copolymer of 2,3 - difluoro - 2 - trifluoromethylazirine and at least one member of the group consisting of the compounds of claim 1, ethylene oxide, tetrafluoroethylene oxide, thiocarbonyl fluoride, trifluorothioacetyl fluoride, perfluorobutanethioyl chloride and perfluoroacetone.

6. A copolymer of 2,3-difluoro-2-trifluoromethylazirine and thiocarbonyl fluoride.

7. A copolymer of 2,3-difluoro-2-trifluoromethylazirine and tetrafluoroethylene oxide.

8. A polymer of 2,2-difluoro-3-trifluoromethylazirine.

9. The polymerization process which comprises maintaining at least one fluoro-substituted azirine under low temperature polymerization conditions under the influence of an ionic polymerization catalyst or high voltage electrons.

10. The polymerization process of claim 9 employing, in addition to an azirine, at least one member of the group consisting of ethylene oxide, tetrafluoroethylene oxide, thiocarbonyl fluoride, trifluorothioacetyl fluoride, perfluorobutanethioyl chloride and perfluoroacetone.

11. The polymerization process which comprises maintaining 2,3-difluoro - 2 - trifluoromethylazirine under low temperature polymerization conditions under the influence of an ionic polymerization catalyst or high voltage electrons.

12. The polymerization process which comprises maintaining 2,2-difluoro-3-trifluoromethylazirine under low temperature polymerization conditions under the influence of an ionic polymerization catalyst or high voltage electrons.

13. The process of claim 10 employing 2,3-difluoro-2-trifluoromethylazirine and thiocarbonyl fluoride.

14. The process of claim 10 employing 2,3-difluoro-2-trifluoromethylazirine and tetrafluoroethylene oxide.

References Cited by the Examiner

Smolinsky: 83, Journal, American Chemical Society, pp. 4483–4, November 1961.

LEON J. BERCOVITZ, *Primary Examiner.*

M. I. MARQUIS, *Assistant Examiner.*

UNITED STATES PATENT OFFICE
CERTIFICATE OF CORRECTION

Patent No. 3,255,157                                      June 7, 1966

Charles S. Cleaver

It is hereby certified that error appears in the above numbered patent requiring correction and that the said Letters Patent should read as corrected below.

Column 1, lines 50 to 54, the formula should appear as shown below instead of as in the patent:

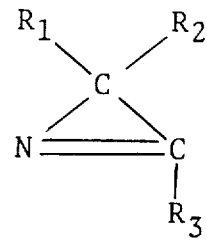

column 2, lines 23 to 25, the formula should appear as shown below instead of as in the patent:

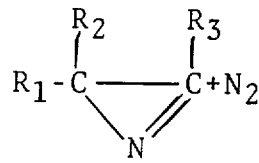

same column 2, lines 35 to 39, the formula should appear as shown below instead of as in the patent:

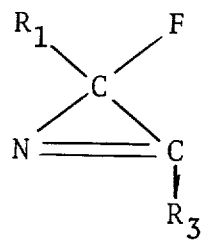

3,255,157 same column 2, line 52, for "on" read -- no --; column 3, line 27, for "fluoroaziridine-derived" read -- fluoroazirine-derived --; column 9, line 66, for "proviso" read -- provisos --; column 10, lines 10 to 13, the formula should appear as shown below instead of as in the patent:

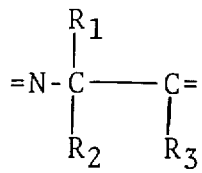

same column 10, lines 32 and 33 and line 48, for "perfluoroacetone", each occurrence, read -- perfluorothioacetone --.

Signed and sealed this 1st day of August 1967.

(SEAL)
Attest:

EDWARD M. FLETCHER, JR.
Attesting Officer

EDWARD J. BRENNER
Commissioner of Patents